(12) United States Patent
McRae

(10) Patent No.: US 11,823,555 B2
(45) Date of Patent: Nov. 21, 2023

(54) SAFETY BUTTON WITH DUAL COMMUNICATION

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/834,111

(22) Filed: Jun. 7, 2022

(65) Prior Publication Data

US 2022/0392331 A1     Dec. 8, 2022

Related U.S. Application Data

(60) Provisional application No. 63/208,218, filed on Jun. 8, 2021.

(51) Int. Cl.
| | |
|---|---|
| *G08B 25/01* | (2006.01) |
| *G08B 25/00* | (2006.01) |
| *H04W 84/12* | (2009.01) |
| *H04W 4/90* | (2018.01) |
| *G08B 25/10* | (2006.01) |

(52) U.S. Cl.
CPC ......... *G08B 25/016* (2013.01); *G08B 25/004* (2013.01); *G08B 25/10* (2013.01); *H04W 4/90* (2018.02); *H04W 84/12* (2013.01)

(58) Field of Classification Search
CPC .... G08B 25/004; G08B 25/016; G08B 25/10; H04W 4/90; H04W 84/12
See application file for complete search history.

(56) References Cited

U.S. PATENT DOCUMENTS

| | | | | |
|---|---|---|---|---|
| 8,676,152 | B2* | 3/2014 | McQuaide, Jr. | H04W 4/90 455/418 |
| 9,001,682 | B2* | 4/2015 | Kovvali | H04W 48/18 370/252 |
| 11,031,688 | B2* | 6/2021 | Ramasamy | H01Q 3/26 |
| 2012/0201213 | A1* | 8/2012 | Banerjea | H04W 72/0453 370/329 |

(Continued)

FOREIGN PATENT DOCUMENTS

KR       101535596       7/2015

*Primary Examiner* — John A Tweel, Jr.
(74) *Attorney, Agent, or Firm* — Boyle Fredrickson S.C.

(57) ABSTRACT

A safety button includes an activation element, a first communication device, a second communication device, and a controller. The first communication device is configured to connect the safety button to a WLAN, while the second communication device is configured to connect the safety button to a user device such as a smart phone. The controller is in communication with the first and second communication devices. The controller is configured to cause the safety button to communicate with the WLAN via the first communication device if the safety button is connected to the WLAN, and to cause the safety button to communicate with the user device via the second communication device if the safety button is not connected to the WLAN. Upon actuation of the activation element, an alert signal is communicated to a remote server by way of either the WLAN or the user device.

20 Claims, 5 Drawing Sheets

(56) References Cited

U.S. PATENT DOCUMENTS

| | | | |
|---|---|---|---|
| 2014/0266705 A1* | 9/2014 | McKinley | G08B 25/004 340/539.11 |
| 2014/0347973 A1 | 11/2014 | Yu et al. | |
| 2017/0032659 A1* | 2/2017 | Jordan | G08B 25/004 |
| 2018/0130336 A1 | 5/2018 | Bangerter et al. | |

* cited by examiner

SAFETY BUTTON WITH DUAL COMMUNICATION

CROSS-REFERENCE TO RELATED APPLICATIONS

The present application claims priority to U.S. Provisional Application No. 63/208,218, filed on Jun. 8, 2021, the entire contents of which are incorporated herein by reference.

BACKGROUND OF THE INVENTION

1. Field of the Invention

The present invention relates to a safety button, and more particularly, to a personal safety button with dual low power communication devices or radios and to a method of using such a safety button.

2. Discussion of the Related Art

Personal safety buttons, sometimes called personal panic buttons, provide one touch access to emergency services for the user. Examples of such safety buttons are the SIDE-KICK™ marketed by React Mobile and the RIPPLE™ marketed by Ripple Safety. The typical personal safety button is relatively small and discreet (on the order of 150 cm$^2$ or less) and can be easily carried by a user in a variety of locations. For example, the safety button may be placed in a pocket, placed in a purse, worn around the neck on a necklace or lanyard, put on a keychain, or clipped onto an object.

The typical safety button has a radio that allows for communication with a recipient device, such as a smart phone or a home network hub, in the vicinity of the safety button. The safety button features an activation element, such as a button or the like, that transmits a distress message or other actuation signal to the recipient device when actuated. The recipient device then coordinates with an external server to execute a task in response to the receipt of the distress signal. The task may, for example, be some combination of notifying emergency services, triggering an alarm system, and/or notifying trusted individuals such as friends or relatives.

Safety buttons are powered by internal batteries which must be periodically charged or replaced. Since constant need to recharge reduces the utility of the safety button and can cause major problems if power runs out, battery life is an important property when assessing personal safety buttons.

Current personal safety buttons in the marketplace use only a single communication device or radio for transmitting an alert signal. Some safety buttons use very low power radios operating in the sub-GHZ frequency range to extend battery life to a year or more. However, these devices must work within a small network like home or hospital to achieve this type of battery life. Not being able to use such a device outside of the small network reduces the utility of the device.

Other personal safety buttons use cellular radios to operate anywhere, but the battery life of such radios is measured in days due to their high-power requirement.

There thus is a need in the art for a personal safety button that has long battery life, yet need not be located in a small network to operate.

SUMMARY OF THE INVENTION

According to one aspect of the invention, this and possibly other needs are met by providing a safety button that includes an activation element, a first communication device, a second communication device, and a controller. The first communication device is configured to transmit an actuation signal to an external server on a network over a first communication path when the safety button is connected to the network. The first communication device may be a very low power radio operating in a sub-GHz range and having a range of about 1 km. The second communication device is configured to transmit an actuation signal directly to a user device over a second communication path. The second communication device may be a Bluetooth radio, more typically a Bluetooth Low Energy (BLE) radio operating in a frequency range of over a GHz. The controller is in communication with both the first and second communication devices and is configured to cause the first communication device to transmit the actuation signal to the external server when the safety button is connected to a network. Conversely, the controller is configured to cause the second radio to transmit the actuation signal to the user device when the safety button is located outside of the safety network and/or otherwise is not connected to the network, and the user device then transmits a signal to the external server. In either event, the actuation signal is reliably received by the external server.

In accordance with another aspect of the invention, the network and the user device may be connected to a remote server. The controller is configured to initiate transmission of an alert signal to the server upon actuation of the activation element by a user.

The network may include a wireless local area network (WLAN) having a safety hub in communication with the first radio of the safety button.

Also disclosed is a method of operating a safety device having at least some of the features described above.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
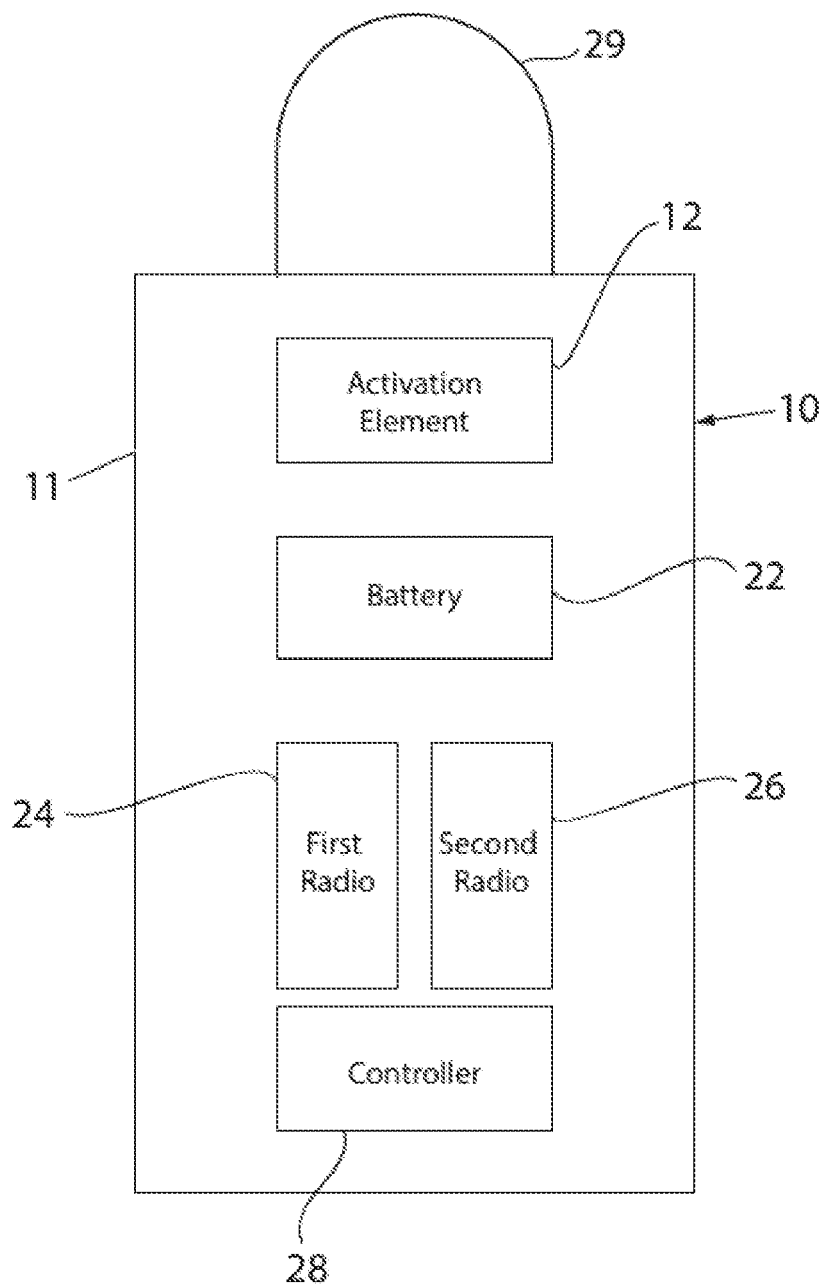
FIG. 1 is a schematic view of a safety button, according to an embodiment of the invention.

Referring now to FIG. 1, a safety button 10 with an activation element 12 is shown in accordance with an aspect of the invention. Specifically, the safety button 10 includes an activation element 12 disposed on a housing 11. In addition, the safety button 10 includes a safety button circuitry 20, a power supply 22 in the form of a battery, a first communication device 24, a second communication device 26, and a controller 28 configured to operate the safety button 10 with either the first communication device 24 or the second communication device 26 disposed within the housing 11. The communication devices 24 and 26 may be radios. The safety button 10 may be a relatively small device. The housing 11 of the safety button 10 typically will have a major face, i.e., largest surface, having an area of less than 150 $cm^2$ and more typically an area of less than 50 $cm^2$. The safety button can be easily carried by a user in a variety of locations. For example, the safety button 10 could be put into a pocket or a purse. The safety button 10 could also include a connector 29, such as a strap, for attachment to a user article, such as but not limited to, a necklace or a keychain. The activation element 12 may be any number of devices a user may actuate to generate an actuation signal. For example, the activation element 12 may be a push button, a touch screen, a switch, or any other device that may be physically engaged by a user. Activation element 12 could also be a microphone that is responsive to a voice command. The controller 28 includes circuity as detailed below in conjunction with FIG. 2 and functions to control the first and second communication devices or radios 24 and 26 of FIG. 2 and to generate an actuation signal in response to actuation of activation element 12.

Figure 2:
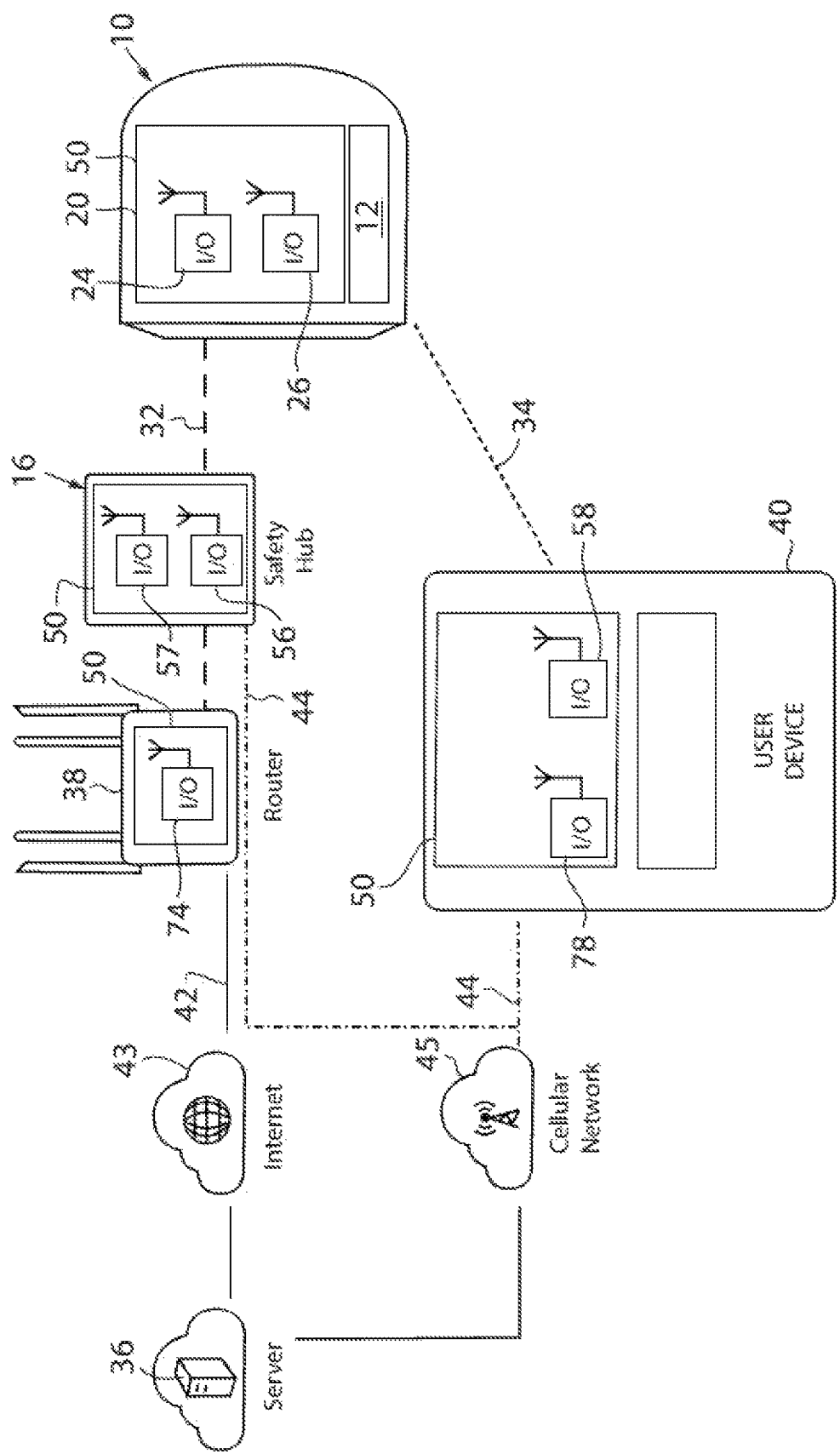
FIG. 2 a schematic view of a network interfacing with the safety button of FIG. 1.
Figure 3:
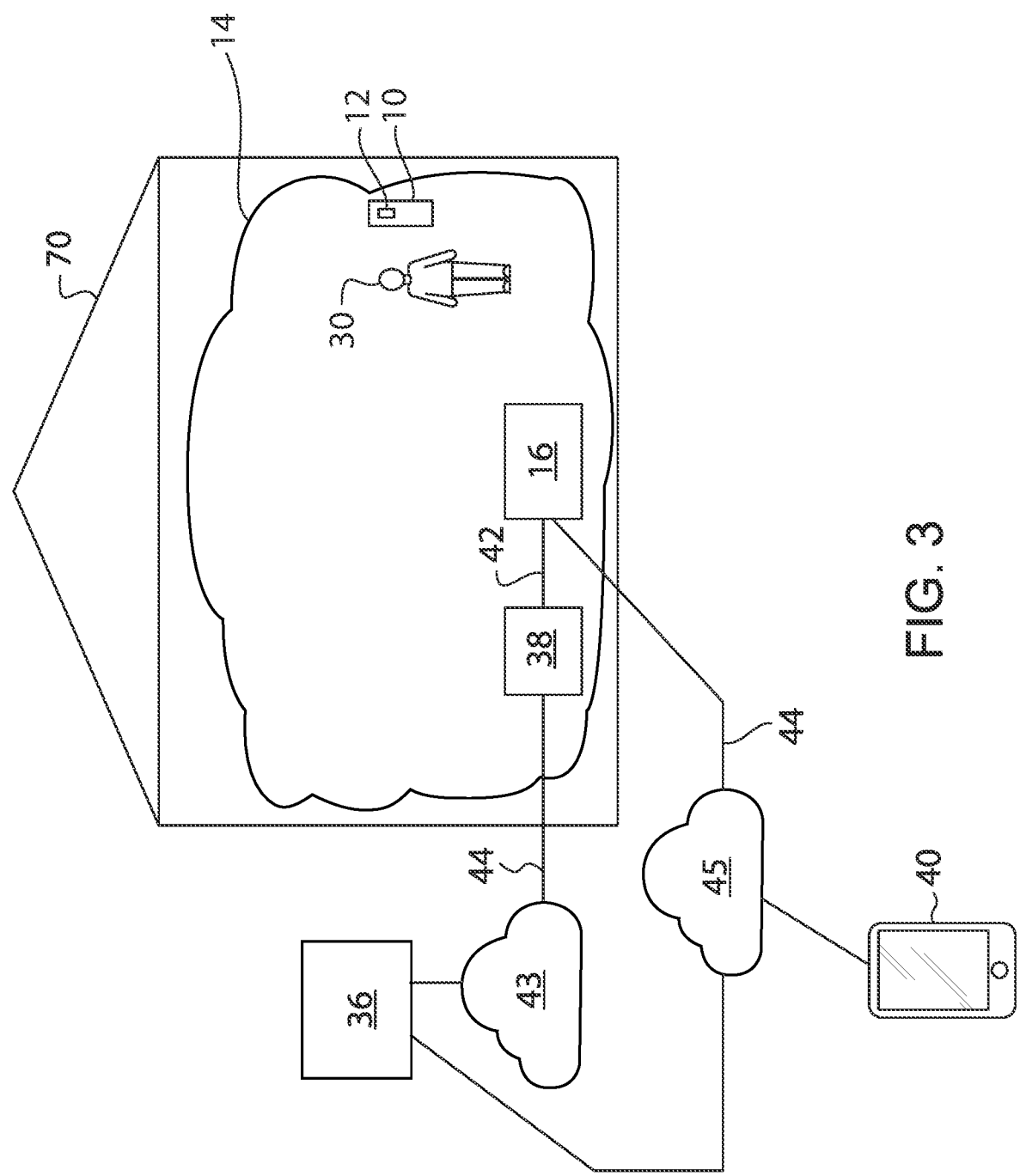
FIG. 3 is a schematic view of the safety button of FIG. 1, located inside of the network and communicating with a safety hub of a network via a first communications device.

Referring to FIGS. 2 and 3, the safety button 10 may be located within a safety network 14 implemented in a WLAN (wireless local area network) communicatively connected to a WAN (wide area network) via a gateway router 38. Safety network 14 includes a safety hub 16 that permits the safety button 10 to communicate with an external server 36, such as a cloud-based server, and thence to a user device 40. The safety button 10 can also communicate directly with the user device 40. Safety button 10, safety hub 16, gateway router 38, and user device 40 all have circuitry 50 that includes corresponding hardware, firmware, software, or any combination thereof for controlling, for example, data transmission or other communications through respective segments of network 14. This circuitry 50 typically includes a processor, a non-transient memory storage device, one or more I/O communication devices or radios, among other components. In addition, the safety hub 16 may include a power supply, such as a backup battery, to maintain power during a power outage of the network 14. In the event of a power outage or an internet service outage rendering the safety hub 16 unable to connect to the Internet via the router 38, the safety hub 16 includes another wireless I/O communication device 57 capable of connecting to a mobile cellular network 45 and a cellular communication path 44, detailed below. User device 40 may be a smart phone, a tablet computer, a desktop computer, a laptop computer, or the like. In addition to having circuitry, user device 40 may have one or more of a microphone, a speaker, a video display, and/or a user interface such as a touchscreen that doubles as the video display. The user device 40 also may be equipped with GPS to permit identification of the location of the user 30 (FIGS. 3 and 4) when the activation element 12 of the safety button 10 is actuated.

Still referring to FIG. 2, the safety hub 16 and user device 40 can communicate with the safety button 10 over first and second communication paths 32 and 34, respectively as detailed below. The safety hub 16 communicates wirelessly with the server 36 via the gateway router 38. Router 38 is connected to an external server 36, such as a cloud-based server, via a wired connection 42 and the Internet 43. Safety hub 16 may be eliminated as a stand-alone module if its functionality is incorporated into the gateway router 38, in which case the router 38 also serves as a hub 16. A radio 78 of the user device 40 also communicates with remote server 36 over a cellular communication path 44 and a cellular network 45. The safety hub 16 may also communicate over the cellular communication path 44 and the cellular network 45 in the event of failure of the Internet or loss of power to the router 38.

The server 36 or other computing components otherwise in the WLAN or WAN can include or be coupled to a microprocessor, a microcontroller or other programmable logic element (individually and collectively considered "a controller") configured to execute a program. The controller(s) also may be wholly contained in the safety button 10, safety hub 16, and/or the router 38. Alternatively, interconnected aspects of the controller and the programs executed by it could be distributed in various permutations within the safety button 10, safety hub 16, server 36, and router 38. The server 36 can include or be coupled to a microprocessor, a microcontroller or other programmable logic element configured to execute a program. This program, while operating at the server level, may be utilized to execute a task in response to receipt of the alert signal generated when the activation button 12 of the safety button 10 is actuated. The task may be one or more of 1) transmission of a notification to emergency service provider(s) such as medical or security personnel; 2) transmission of a notification to a user device of one or more designated individuals such as trusted friends or family members; and 3) the activation of an audio and/or visual alarm on the user device 40 or some other device, such as alarm(s) of a home security system. The same or a similar program may be saved as an app on the user device 40 and perform the same or similar tasks upon receipt of a distress signal from the safety button.

The circuitry 50 of the safety button 10, safety hub 16, router 38, and user device 40 may have different numbers and types of wireless I/O communication devices or radios, while allowing for the establishment of discrete communication paths with each radio including, for example, a transceiver and cooperating antenna for transmitting and receiving signals or data. In the illustrated embodiment, and still referring to FIGS. 1 and 2, the safety button 10 has first and second communication devices in the form of first and second radios 24 and 26. The first radio 24 communicates with a compatible radio 56 in the safety hub 16 over the first communication path 34, and the second radio 26 communicates with a compatible radio 58 in the user device 40 over the second communication path 34. The first radio 24 transmits data at a different frequency and bandwidth than the second radio 26. The first radio 24 also may have a lower power requirement than the second radio 26. For example, the first radio 24 and the compatible radio 56 in the safety hub 16 may operate in a low power home network with a frequency in the sub-GHz range and provide up to 1 km of range from safety hub 16. The second radio 26 may be configured to pair with user devices such as mobile phones, using BLE as one example. A radio communicating over BLE will consume more power than the first radio 24 but still uses sufficiently little power to provide long battery life. BLE typically operates in the range of about 2.4 GHz, consumes 0.01-50 W of power, and has a range of on the order of 100 m. It is contemplated that the battery life of a safety button operated by a typical user will be on the order of one year or more.

FIG. 3 illustrates the safety button 10 being carried by a user 30 within the safety network 14 and paired with the safety hub 16. In the illustrated example, the setting is a home 70. The safety network 14 is shown as being confined within the home 70. However, if the network 14 is defined as the communication range of the safety hub 16 and the first radio 24, the network 14 could have a range of well over 100 m, and up to 1 km in some implementations, from the safety hub 16. Referring simultaneously to FIGS. 2 and 3, when in range of the radio 56 of the safety hub 16, the first radio 24 of the safety button 10 communicates with radio 56 of safety hub 16 over the first communication path 32. The hub 16, in turn, communicates with the external server 36 via either 1) the gateway router 38, the communication path 42, and the Internet 43, or 2) the communication path 44 and the cellular network 45. User device 40 communicates with the external server 36 either directly via the cellular network 45 or indirectly via the safety hub 16, the router 38, and the Internet 43. The resultant operation is detailed below in conjunction with blocks 204-208 of FIG. 5.

Figure 4:
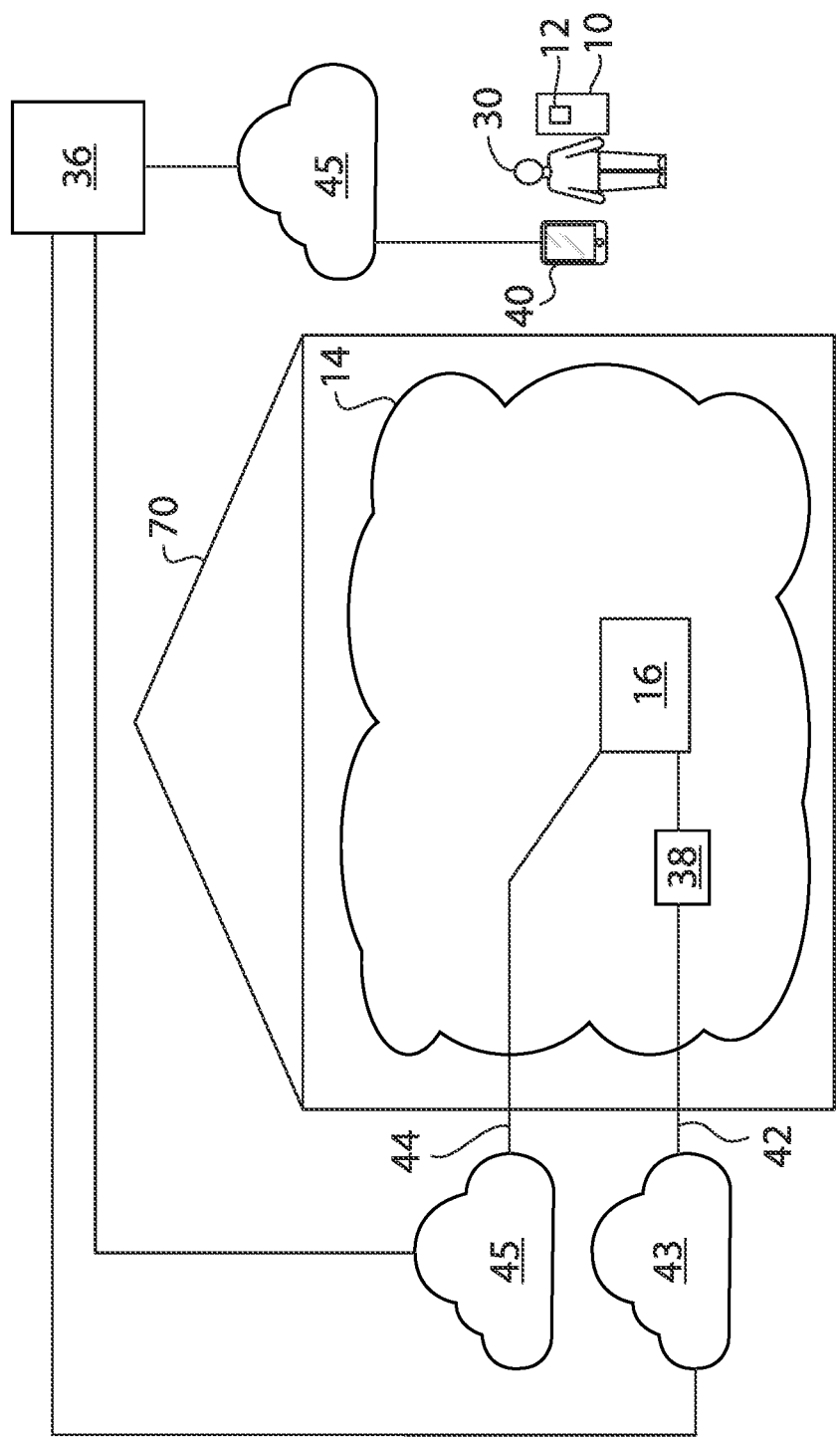
FIG. 4 is a schematic view of the safety button of FIG. 1 located outside of the network and communicating with a user device via a second communications device.

FIG. 4 illustrates a scenario in which the safety button 10 cannot be paired with the safety hub 16. More specifically, the illustrated example shows a setting in which the safety button 10 is located outside of the network 14. In this case, the second radio 26 of the safety button 10 communicates with the radio 58 of the user device 40 over the second communication path 34, and the user device 40 communicates with the server 36 via the cellular network 45. Referring simultaneously to FIGS. 2 and 4, when the first radio 24 is outside of the range of the radio 56 of the safety hub 16 or otherwise cannot pair with radio 56, the second radio 26 of the safety button 10 communicates with radio 58 of the user device 40 over the second communication path 34. The safety hub 16 communicates with the external server 36 either via: 1) the communication path 42 by way of the radio 74 in the gateway router 38 and the Internet 43; or 2) the communication path 44 and the cellular network 45. That communication, however, may not play a role in the operation when the safety button 10 is located outside of the safety network 14. The resultant operation is detailed below in conjunction with blocks 210-214 of FIG. 5.

Figure 5:
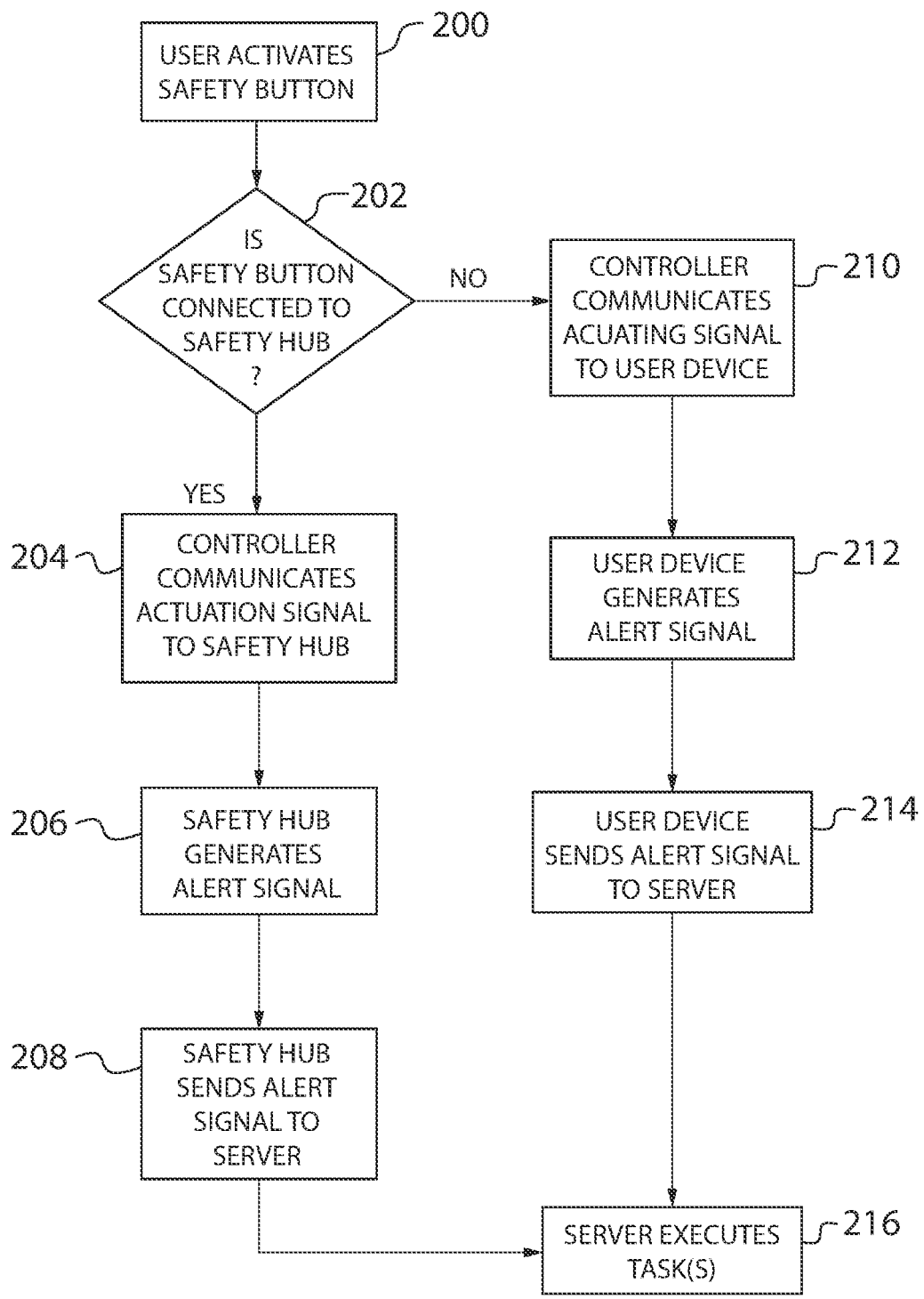
FIG. 5 is a flowchart of a process via which a safety button communicates with a remote server.

Referring next to FIG. 5, a flowchart is shown regarding the process of the controller 28 of the safety button 10 which results in transmission of a signal to the server 48 via either the first radio 24 and the safety hub 16 or the second radio 26 and the user device 40.

At block 200, the user 30 actuates the activation element 12 of the safety button 10. The controller 28 then determines whether first radio 24 is connected to or, stated another way, paired with the radio 56 of the safety hub 16 at block 202. This determination may take the form of a standard polling function that is performed whenever the system is active, not just when the user actuates the activation element 12. This polling does not significantly impact battery life. A standard coin cell battery will last two years with infrequent polling on sub-GHz frequency.

If the answer to this inquiry is YES, the process proceeds to block 204, and communication proceeds as discussed briefly above in connection with FIG. 3. The radio 24 thus transmits an actuation signal to the radio 56 of the safety hub 16 in Block 204. Safety hub 16 may then generate an alert signal or a distress signal at block 206. The alert signal may include information regarding the user 30 (i.e., name, medical conditions, etc.) and the location of the safety hub 16. That location may be provided either via GPS located within the safety hub 16 or by the owner of the network 14 during system set-up. At block 208, the safety hub 16 sends the alert signal to the server 36 via the router 38 and the Internet 43. Alternatively, the safety hub 16 may send the alert signal to the server 36 via the mobile network 45 if it is unable to establish a connection with the Internet 38 via the router 38 due, for example due to a loss of power to the router 38.

A NO answer to inquiry block 202 indicates that the radio 24 of safety button 10 is not connected to radio 56 of the safety hub 16. This lack of connectivity could occur if the safety button 10 is located outside of the safety network 14 as shown in FIG. 4. Connection also could fail if the network containing the safety hub 16 is down, and/or if the safety button 10 is otherwise unable to connect to the safety hub 16 via the radio 24. As a result, alert signals are transmitted to the server 36 from the user device 40 as shown in FIG. 4 rather than from the safety hub 16. Specifically, in block 210, the controller 28 causes the radio 26 of the safety button 10 to transmit an actuation signal to the user device 40. The radio 26 would have been previously paired with the user device 40 using a polling technique such as discussed above. At block 212, a program in the user device 40 generates an alert signal in response to the receipt of the signal from the radio 26. At block 214, the user device 40 sends the alert signal to the server 36 via the mobile network 45. That alert signal may include the location of the user device 40, as well as other information such as the name of the user, medical information, etc., or the reason for activation device actuation.

Regardless of the communications path over which the alert signal is transmitted the server 36 executes a task in response to the receipt of the alert signal in block 216. That task may or may not differ if the alert signal is received from the safety hub 16 or the user device 40. In one instance, the server 36 may be programmed to determine whether the alert signal was received from the safety hub 16 or the user device 40. When determining that the alert signal was received from the safety hub 16, the server 36 may be able to use a registered address of the safety hub 16 as the location of the user, or may receive that location directly from a GPS locater in the safety hub 16 or router 38. When determining that the notification was received from the user device 40, the server 36 can use the location data included in the alert from the GPS component of the user device 40. Any of a variety of tasks can then be executed. For example, the server 36 may transmit a distress signal to devices of emergency services and/or to trusted individuals whose identities and contact information have been pre-stored, typically using an app on the user device 40. This signal could include the user identity. It also could identify the reason for the transmission of the distress signal, such as a user falling, some other medical condition, or a concern for the user's safety or security. It could also generate an alarm within the network 14 via the safety hub 16, within the user device 40, and/or in any device or system in communication with the server 36 or the safety hub 16.

It can thus be seen that the safety button relies on two low power communication devices to maintain communications regardless of the location of the safety button or the operational state of a network to which the safety button is configured to be paired. The smart button uses a first, extremely low power communication device to communicate within the network when such communications are possible, and a second communication device to communicate directly with a user device when communications via the first communication device are not possible. In either event, actuation of the safety button results in the transmission of an alert signal to an external server, which then executes a task responsive to safety button actuation.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

I claim:

1. A safety button comprising:
   a mobile housing that can be carried by a person;
   an activation element supported on the housing;
   a first communication device located in the housing, the first communication device being configured to connect to and communicate with a wireless local area network (WLAN);
   a second communication device located in the housing, the second communication device being configured to connect to and communicate with a user device; and
   a controller which is in operative communication with the first and second communication devices and which is configured to:
      determine whether the first communication device is connected to the WLAN,
      cause the safety button to transmit an actuation signal to the WLAN via the first communication device in response to actuation of the activation element if it is determined that the first communication device is connected to the WLAN, and
      cause the second communication device to transmit an actuation signal to the user device via the second communication device upon actuation of the activation element if it is determined that the first communication device is not connected to the WLAN.

2. The safety button of claim 1, wherein the housing has a major face having an area of no more than 150 cm².

3. The safety button of claim 1, wherein the controller is configured to initiate transmission of an alert signal to a remote server upon actuation of the activation element by a user.

4. The safety button of claim 3, wherein the controller is configured to initiate transmission of the alert signal to the remote server via the first communication device when the first communication device is connected to the WLAN.

5. The safety button of claim 3, wherein the controller is configured to initiate transmission of the alert signal to the remote server via the second communication device when the first communication device is not connected to the WLAN.

6. The safety button system of claim 3, wherein the alert signal includes location data of the safety hub if the actuation signal is transmitted to the safety hub by the first radio and includes location data of the user device if the actuation signal is transmitted to the user device by the second radio.

7. The safety button of claim 1, wherein the first communication device operates with a first power requirement, and the second communication device operates with a second power requirement that is higher than the first power requirement.

8. The safety button of claim 1, wherein the first communication device is a sub-GHz radio operating at a frequency of less than 1 GHz, and the second communication device is a radio operating at a higher frequency than the operational frequency of the first radio.

9. The safety button of claim 8, wherein the second communication device is a Bluetooth radio.

10. A method of transmitting an alert signal from a safety button to a remote server, the method comprising:
    providing the safety button, the safety button comprising:
       a housing that can be carried by a person;
       an activation element located on the housing;
       a first communication device located in the housing,
       a second communication device located in the housing,
    determining whether the first communication device is connected to a wireless local area network (WLAN);
    actuating the activation element of the safety button;
    in response to the actuation and determination of whether the first communication device is connected to the WLAN, transmitting an actuation signal to the WLAN via the first communication device when the first communication device is connected to the WLAN, and transmitting an actuation signal to a user device via the second communication device when the first communication device is not connected to the WLAN.

11. The method of claim 10, further comprising
    generating an alert signal in response to receipt of the actuation signal, the alert signal being generated within the WLAN if the actuation signal is transmitted by the first communication device and being generated by the user device if the actuation signal is transmitted by the second communication device;
    communicating the alert signal to a remote server;
    using the remote server to execute a task.

12. The method of claim 11, wherein the task comprises at least one of: sending a signal to emergency service providers, sending a signal to a user device of one or more designated individuals, and generating an alarm.

13. The method of claim 11, wherein the alert signal includes location data of a safety hub if the actuation signal is transmitted to the safety hub by the first radio and includes location data of the user device if the actuation signal is transmitted to the user device by the second radio.

14. The method of claim 10, wherein the first communication device is a radio operating at a frequency of less than 1 GHz, and the second communication device is a radio operating a higher frequency than the operational frequency of the first radio.

15. The method of claim 10, wherein the first communication device has a lower power requirement higher than a power requirement of the second communication device.

16. A safety button system including:
    a safety hub configured to communicate with an external server;
    a safety button comprising:
       a housing that can be carried by a person;
       an activation element located on the housing;
       a first radio located in the housing and operating at a frequency of less than 1 GHz, the first radio being configured to connect to and communicate with the safety hub;
       a second radio located in the housing and operating at a frequency over 1 GHz, the second radio being configured to connect to and communicate with a user device including at least one of a smart phone, a smart tablet, and a laptop computer; and a controller in communication with the first and second radios, the controller configured to:
  determine whether the first radio is connected to the safety hub;
  cause the safety hub to send an alert signal to an external server via the first radio in response actuation of the activation element if it is determined that the first radio is connected to the safety hub, and
  cause the user device to transmit an alert signal to the external server via the second radio in response to actuation of the activation element if it is determined that the first radio is not connected to the safety hub.

17. The safety button system of claim 16, wherein the safety hub is part of a wireless Local Area Network (WLAN).

18. The safety button system of claim 16, wherein the alert signal includes location data of the safety hub if the actuation signal is transmitted to the safety hub by the first radio and includes location data of the user device if the actuation signal is transmitted to the user device by the second radio.

19. The safety button system of claim 16, wherein the external server is configured to execute a task in response to receipt of an alert signal, the task including at least one of sending a distress signal to emergency service providers, sending a signal to a user device of a trusted individual, and generating an alarm.

20. The safety button system of claim 16, wherein the safety hub includes a power source and is connectable to the external server by way of a gateway router and a mobile cellular network.

* * * * *